(12) United States Patent
Kim (10) Patent No.: US 11,506,758 B2
(45) Date of Patent: Nov. 22, 2022

(54) LIDAR DEVICE AND METHOD OF OPERATING THE SAME FOR DETERMINING A NUMBER OF PHOTODIODES TO BE ACTIVATED BASED ON A DETECTED ILLUMINANCE

(71) Applicant: Samsung Electronics Co., Ltd., Suwon-si (KR)

(72) Inventor: Jungwoo Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 384 days.

(21) Appl. No.: 16/913,100

(22) Filed: Jun. 26, 2020

(65) Prior Publication Data

US 2021/0208255 A1  Jul. 8, 2021

(30) Foreign Application Priority Data

Jan. 2, 2020 (KR) .................... 10-2020-0000483

(51) Int. Cl.
| | |
|---|---|
| *G01S 7/481* | (2006.01) |
| *G01S 17/08* | (2006.01) |
| *G01S 7/4863* | (2020.01) |
| *G01S 7/4912* | (2020.01) |
| *G01S 17/02* | (2020.01) |
| *G01S 17/74* | (2006.01) |

(52) U.S. Cl.
CPC .......... *G01S 7/4816* (2013.01); *G01S 7/4815* (2013.01); *G01S 7/4817* (2013.01); *G01S 17/08* (2013.01); *G01S 7/4863* (2013.01); *G01S 7/4912* (2013.01); *G01S 17/02* (2013.01); *G01S 17/74* (2013.01)

(58) Field of Classification Search
CPC .... G01S 7/4816; G01S 7/4815; G01S 7/4817; G01S 17/08; G01S 7/4863; G01S 7/4912; G01S 17/02; G01S 17/74; G01S 17/42; G01S 7/4914; G01J 2001/446
See application file for complete search history.

(56) References Cited

U.S. PATENT DOCUMENTS

| | | | |
|---|---|---|---|
| 2013/0015331 A1 | 1/2013 | Birk et al. | |
| 2016/0284743 A1 | 9/2016 | Mellot et al. | |
| 2017/0242108 A1 | 8/2017 | Dussan et al. | |
| 2017/0301716 A1 | 10/2017 | Irish et al. | |
| 2018/0081040 A1* | 3/2018 | Kubota | ................ G01S 7/4865 |
| 2018/0299552 A1 | 10/2018 | Shu et al. | |
| 2019/0265356 A1* | 8/2019 | Ueno | .................... G01S 7/4865 |
| 2021/0109199 A1* | 4/2021 | Hennecke | ............ G02B 26/105 |
| 2021/0190950 A1* | 6/2021 | McLeod | ................. G01S 7/484 |

\* cited by examiner

*Primary Examiner* — Jennifer D Bennett
(74) *Attorney, Agent, or Firm* — Sughrue Mion, PLLC (57) ABSTRACT

Provided is a light detection and ranging (LiDAR) device including an illuminance sensor configured to detect illuminance of light received by the LiDAR device, a photodiode array including a plurality of photodiodes that are connected in parallel, the plurality of photodiodes being configured to generate a current based on the light received, and a processor configured to determine a number of photodiodes included in the photodiode array to be activated based on the illuminance and activate the determined number of photodiodes.

20 Claims, 10 Drawing Sheets

LIDAR DEVICE AND METHOD OF OPERATING THE SAME FOR DETERMINING A NUMBER OF PHOTODIODES TO BE ACTIVATED BASED ON A DETECTED ILLUMINANCE

CROSS-REFERENCE TO RELATED APPLICATION

This application claims priority from Korean Patent Application No. 10-2020-0000483, filed on Jan. 2, 2020, in the Korean Intellectual Property Office, the disclosure of which is incorporated herein in its entirety by reference.

BACKGROUND

1. Field

Example embodiments of the present disclosure relate to LiDAR devices and methods of operating the LiDAR devices.

2. Description of Related Art

Light detection and ranging (LiDAR) systems are applied to various fields, such as aerospace, geology, three-dimensional maps, automobiles, robots, drones, etc.

LiDAR devices use a time-of-flight (ToF) measurement of light as a basic operating principle. For example, a LiDAR device may transmit light toward an object and receive it through a sensor and may measure flight time by using a high speed electrical circuit. Also, the LiDAR device may calculate a distance from the flight time to the object and generate a depth image of the object by using the distance calculated for each position of the object.

The LiDAR device may include at least one light source for radiating light toward an object and a plurality of photodiodes for receiving light reflected from the object. However, when the LiDAR device is used outdoors, the LiDAR device receives ambient light as well as light reflected from the object. Due to the influence of ambient light, there may be a limit for the LiDAR device in obtaining accurate information about the object. Accordingly, there is a need to develop a technique for obtaining accurate information even in an environment in which there is ambient light.

SUMMARY

One or more example embodiments provide light detection and ranging (LiDAR) devices and methods of operating the same. One or more example embodiments also provide non-transitory computer-readable recording media having recorded thereon a program for executing the methods on a computer. The technical problem to be achieved by the present disclosure is not limited to the technical problems as described above, and other technical problems may be inferred from the following example embodiments.

Additional aspects will be set forth in part in the description which follows and, in part, will be apparent from the description, or may be learned by practice of the example embodiments of the disclosure.

According to another aspect of an example embodiment, there is provided a method of operating a light detection and ranging (LiDAR) device, the method including detecting an illuminance of light received by the LiDAR device, determining a number of photodiodes to be activated in a photodiode array including a plurality of photodiodes that are connected in parallel based on the illuminance, and activating the determined number of photodiodes.

The determining of the number of photodiodes may include reducing the number of photodiodes to be activated as the illuminance increases.

The determining of the number of photodiodes may include determining the number of photodiodes to be activated such that a signal to noise ratio (SNR) of a signal output from an amplifier exceeds a reference value based on a current that is output from the photodiodes and is input to the amplifier.

The activating of the photodiodes may further include selecting a combination in which a minimum distance between the photodiodes being activated is farthest among combinations of the determined number of photodiodes.

The activating of the photodiodes may include changing a combination of the photodiodes being activated based on a preset period while maintaining the determined number of photodiodes, and determining a combination of the activated photodiodes such that an operation period of each photodiode included in the plurality of photodiodes is maximized.

The LiDAR device may further include a plurality of pixel sections each included in the photodiode array and connected in parallel to each other, and the method may further include determining the number of pixel sections to be activated among the plurality of pixel sections based on the illuminance, and activating the determined number of pixel sections.

The determining of the number of the pixel sections may include reducing the number of pixel sections to be activated as the illuminance increases.

The determining of the number of the pixel sections may include determining the number of pixel sections to be activated such that a current output from the plurality of pixel sections is less than or equal to a preset magnitude.

A non-transitory computer-readable recording medium having recorded thereon a program for executing the method on a computer.

A current may be generated by the photodiodes based on receiving light having an intensity above a threshold.

According to another aspect of an example embodiment, there is provided a light detection and ranging (LiDAR) device including a light transmitting device including a plurality of light sources and a beam steering device, a light receiving device configured to receive light reflected by an object that is irradiated with light emitted from the light transmitting device, the light receiving device including an illuminance sensor configured to detect illuminance of the light received, and a photodiode array including a plurality of photodiodes configured to generate a current based on the light received, and a processor configured to determine a number of photodiodes included in the photodiode array to be activated based on the illuminance, and activate the determined number of photodiodes.

BRIEF DESCRIPTION OF THE DRAWINGS

The above and/or other aspects, features, and advantages of example embodiments of the disclosure will be more apparent from the following description taken in conjunction with the accompanying drawings, in which.

DETAILED DESCRIPTION

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Terminologies used herein are selected as commonly used by those of ordinary skill in the art in consideration of functions of the current embodiment, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

In the descriptions of the example embodiments, it will be understood that, when an element is referred to as being connected to another element, it may include electrically connected when the element is directly connected to the other element and when the element is indirectly connected to the other element by intervening a constituent element.

It will be further understood that the term "comprises" or "includes" should not be construed as necessarily including various constituent elements and various operations described in the specification, and also should not be construed that portions of the constituent elements or operations of the various constituent elements and various operations may not be included or additional constituent elements and operations may further be included.

The descriptions of the example embodiments should not be interpreted as limiting the scope of right, and embodiments that are readily inferred from the detailed descriptions and embodiments by those of ordinary skill in the art will be construed as being included in the present disclosure. Reference will now be made in detail to example embodiments, examples of which are illustrated in the accompanying drawings.

Figure 1:
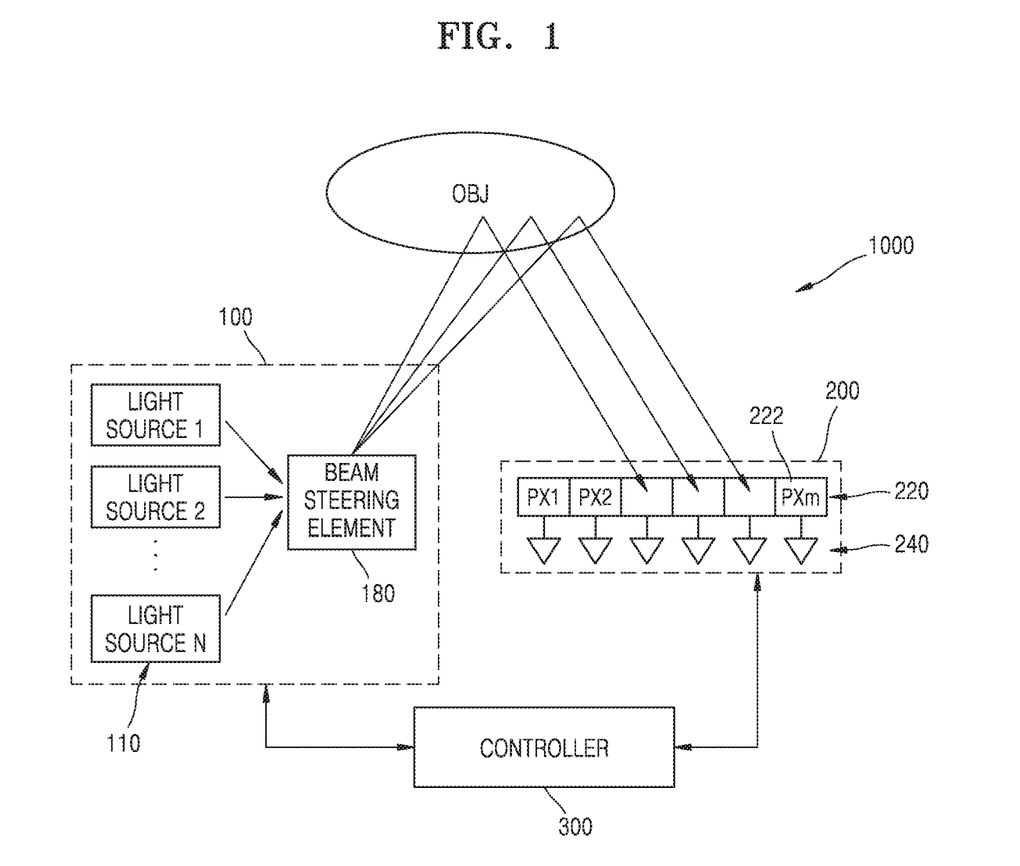
FIG. 1 is a diagram for explaining an operation of a LiDAR device according to example embodiments.

FIG. 1 is a diagram for explaining an operation of a LiDAR device 1000 according to example embodiments.

Referring to FIG. 1, the LiDAR device 1000 may include a light transmitting device 100 that scans light onto an object OBJ, a light receiver 200 that detects reflected light of light emitted from the light transmitting device 100 to the object OBJ, and a controller 300 that controls the light transmitting device 100 and the light receiving device 200. The LiDAR device 1000 may further include other general purpose components in addition to the components shown in FIG. 1.

The light transmitting device 100 may include a light source 110 including one or more light source, for example light source 1, light source 2, . . . light source N, and a beam steering element 180.

In an example embodiment, the arrangement and driving of the light source 110 and the beam steering element 180 may be determined such that light emitted from each of the at least one light source scans the object OBJ at different irradiation angles through the beam steering element 180. In another example embodiment, the arrangement and driving of the light source 110 and the beam steering element 180 may be determined such that light emitted from each of the at least one light source scans the object OBJ at the same irradiation angle through the beam steering element 180.

The light sources of the light source 110 may emit light to be used for analyzing position and shape of the object OBJ. The light source 110 may generate and radiate light having a predetermined wavelength. For example, may emit light of a wavelength band suitable for analyzing the position and shape of the object OBJ, for example, light of an infrared band wavelength. When using light in an infrared band, mixing with natural light in the visible light range including sunlight may be prevented. However, embodiments are not necessarily limited thereto, and the light source 110 may emit light of various wavelength bands.

The light source 110 may include a light source, such as a laser diode (LD), an edge emitting laser, a vertical-cavity surface emitting laser (VCSEL), a distributed feedback laser, and a light emitting diode (LED), and a super luminescent diode (SLD). The light source 110 may generate and emit light of a plurality of different wavelength bands. The light source 110 may generate and emit pulsed light or continuous light.

The light source may emit light toward the object OBJ under the control of the controller 300. For example, the controller 300 may set an radiation direction or an radiation angle of light emitted from each light source and control the light source 110 such that the at least one light source emits light according to each set radiation angle or radiation direction.

The beam steering element 180 aims light irradiated from the light source 110 toward the object OBJ, and an aiming direction is controlled in sequence such that point light emitted from the light source 110 is directed to scan the entire object OBJ. The beam steering element 180 may be a scanning mirror or an optical phased array.

The light receiving device 200 may include a plurality of pixelated areas 222 that may detect reflected light from the object OBJ for each of receiving areas.

As depicted in FIG. 1, the light receiving device 200 may include a detector array 220 partitioned into a plurality of pixel sections 222. A plurality of photodiodes may be disposed in each of the plurality of pixel sections 222. For example, the plurality of photodiodes form each of the pixel sections 222 divided according to the position in the detector array 220, and each pixel section 222 may detect reflected light from the object OBJ according to light emitted from each of the light sources of the light source 110.

The light receiving device 200 may include a circuit unit 240 for measuring a flight time of portions of light detected by each of the plurality of photodiodes. The light receiving device 200 may further include an optical element configured to collect light from the object OBJ in the pixel sections 222.

The plurality of photodiodes may be a sensor capable of sensing light, and may be, for example, a light receiving device that generates an electrical signal by light energy. However, the type of light receiving element is not specifically limited.

The LiDAR device 1000 according to the example embodiment uses a point scanning method as described above. Thus, the intensity of light received by the photodiode may be less than other methods, for example, a flash method. Therefore, an avalanche photo diode (APD) or a single photon avalanche diode (SPAD) having high sensing sensitivity may be employed as the photodiode. The specific circuit configuration of an analog front end (AFE), a time to digital converter (TDC), etc. may vary depending on what type of receiving element of an avalanche photodiode (APD) or a single-photon avalanche diode (SPAD) is included in the photodiodes of the optical receiving device 200.

The controller 300 may perform signal processing to obtain information about the object OBJ by using light detected by the light receiving device 200. For example, the controller 300 may determine a distance to each position of the object OBJ based on a flight time of light reflected from the object OBJ, and perform data processing for analyzing the position and shape of the object OBJ.

Information analyzed by the controller 300, that is, information about the shape or position of the object OBJ, may be transmitted to another device to be used. For example, the information may be transmitted to a controller of an autonomous driving device, such as an unmanned automobile, a drone, etc. in which the LiDAR device 1000 is employed. In addition, the information may be utilized in smartphones, mobile phones, personal digital assistants, laptops, PCs, various wearable devices, and other mobile or non-mobile computing devices.

The controller 300 may also control an overall operation of the LiDAR device 1000. The controller 300 may partition an area of the object OBJ considering the number of light sources included in the light source 110, and may generate and apply a control signal to the beam steering device 180 such that the entire partitioned region of the object OBJ is scanned by the beam steering device 180.

The controller 300 may control operations of the light source 110 of the light transmitting device 100 and the light receiving device 200. For example, the controller 300 may perform power supply control, on/off control, pulse wave PWM or continuous wave CW generation control with respect to the light source 110. Also, the controller 300 may apply a control signal to each of the photodiodes of the light receiving device 200.

In an example embodiment, the controller 300 may group the photodiodes into a plurality of groups, and the light receiving device 200 may classify and detect light emitted from the light source 110 for each group.

The LiDAR device 1000 may also include a memory in which a program and other data for operations performed by the controller 300 are stored.

The memory may be a hardware for storing various data processed in the LiDAR device 1000. For example, the memory may store data processed and data to be processed by the LiDAR device 1000. Also, the memory may store applications, drivers, etc. to be driven by the LiDAR device 1000.

The memory may be random access memory (RAM), such as dynamic random access memory (DRAM), static random access memory (SRAM), etc. read-only memory (ROM), electrically erasable programmable read-only memory (EEPROM), CD-ROM, blue ray or other optical disk storage, hard disk drive (HDD), solid state drive (SSD), or flash memory, and may further include other external storage devices that may be accessed by the LiDAR device 1000.

Figure 2:
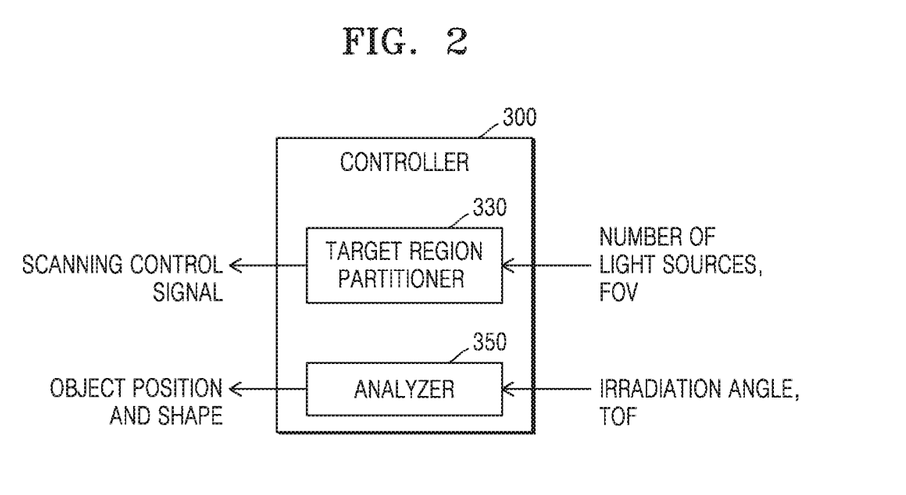
FIG. 2 is a block diagram illustrating a configuration of a controller provided in a LiDAR device according to example embodiments.
Figure 3:
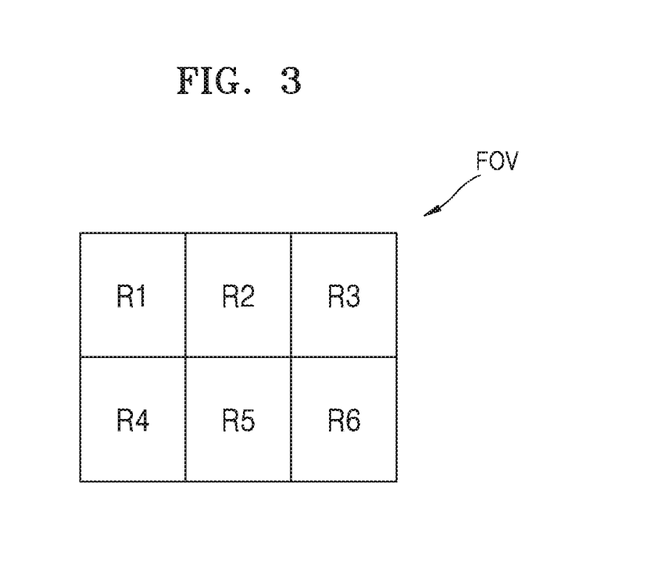
FIG. 3 illustrates an example of a target area partitioned by the controller of FIG. 2.

FIG. 2 is a block diagram illustrating a configuration of a controller provided in a LiDAR device 100 according to example embodiments and FIG. 3 illustrates an example of a target area partitioned by the controller 300 of FIG. 2.

The controller 300 includes at least one processor. The processor may be implemented as an array of multiple logic gates, or may be implemented as a combination of a general purpose microprocessor and a memory in which a program that may be executed in the microprocessor is stored. Also, it will be understood by those skilled in the art that the example embodiment may be implemented by other forms of hardware.

Referring to FIGS. 2 and 3, the controller 300 may include a processor may be implemented as a target region partitioner 330 and an analyzer 350. Code executable by the target region partitioner 330 and the analyzer 350 may be stored in the memory included in the LiDAR device 1000, and the codes may be executed by the controller 300.

The target region partitioner 330 may divide a predetermined field of view (FOV) range in which the object OBJ is included into the same number as the number of light sources included in the LiDAR device 1000. FIG. 3 shows an example in which a FOV range is partitioned into six when the number of light sources is six. However, this is an example, and the number of partitions or the partitioned forms are not limited thereto.

The target region partitioner 330 may generate a scanning control signal and apply the scanning control signal to the optical transmitting unit 100 such that the partitioned region is scanned by the light transmitting device 100. For example, when the beam steering element 180 is a scanning mirror SM, the scanning control signal may be a rotation driving control signal for controlling a rotation direction and a rotation angle.

When the beam steering element 180 is an optical phase array OPA, the scanning control signal may be a phase control signal to be applied to each channel. The phase control signal may be an electrical signal to be applied to meta elements constituting each channel, or may be a phase delay signal for a phase retarder provided in each channel.

The analyzer 350 may analyze a position and shape of the object OBJ by totally considering an irradiation angle of light irradiated onto the object OBJ and ToF values calculated considering the irradiation angle.

Figure 4:
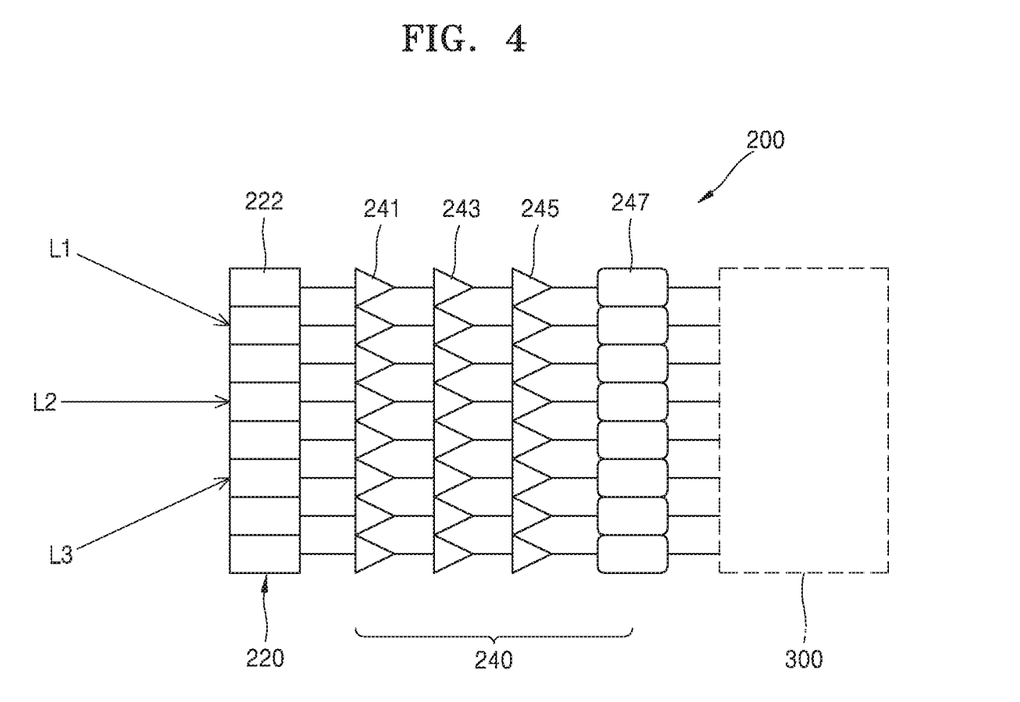
FIG. 4 illustrates a circuit configuration of a light receiver provided in a LiDAR device according to example embodiments.

FIG. 4 illustrates a circuit configuration of the light receiving device 200 provided in the LiDAR device 1000 according to example embodiments.

Referring to FIG. 4, the light receiving device 200 may include the plurality of pixel sections 222, each constituting a plurality of photodiodes and a plurality of time counters 247 that measure a flight time of light detected by each of pixel sections 222.

The light receiving device 200 may include a plurality of current-voltage conversion circuits 241 configured to convert a current output from each of the plurality of pixel sections 222 into a voltage, include a plurality of amplifiers 243 configured to amplify a voltage converted by each of the plurality of current-voltage conversion circuits 241, and include a plurality of peak detectors 245 configured to detect peaks from signals amplified by the plurality of amplifiers 243.

The plurality of pixel sections 222 may detect light L1, light L2, and light L3 received from the object OBJ and output detection information. Detection information detected by the plurality of pixel sections 222 may be transmitted to the controller 300 through a plurality of channels. The plurality of pixel sections 222 may separately detect light L1, light L2, and light L3 from the object OBJ, and output a current.

The plurality of current-voltage conversion circuits 241 may convert a current output from each of the plurality of photodiodes into a voltage.

The plurality of amplifiers 243 may amplify the voltage converted by each of the plurality of current-voltage conversion circuits 241.

The plurality of peak detectors 245 may detect a peak from a voltage amplified by each of the plurality of amplifiers 243. For example, the plurality of peak detectors 245 may detect a peak by detecting a rising edge and a falling edge of an electrical signal. Also, the plurality of peak detectors 245 may detect a peak by using a constant fraction discriminator (CFD) method. The plurality of peak detectors 245 may further include a comparator and may output a converted pulse signal by converting a detected peak into a pulse signal.

Since detection information detected by the pixel sections 222 includes information about light received by the pixel sections 222, hereinafter, the detection information may be at least one of a current outputted by the pixel sections 222, a voltage converted by the current-voltage conversion circuit 241, a voltage amplified by the amplifier 243, and a pulse signal converted by the comparator.

The plurality of time counters 247 may measure a flight time of light by using detection information. When a pulse signal output from each of the plurality of peak detectors 245 is input to the plurality of time counters 247, each of the plurality of time counters 247 may measure a flight time of light by calculating how many cycles of a clock signal are generated from a time point of light radiation by a light source. Also, each of the plurality of time counters 247 may store information about each of flight times of the measured light in a register. Each of the plurality of time counters 247 may be implemented as a TDC.

The measurement results measured by the plurality of time counters 247 are transmitted to the controller 300, and the controller 300 may perform data processing for analyzing information about an object, for example, position, shape, etc. of the object, by using the measurement results.

Figure 5:
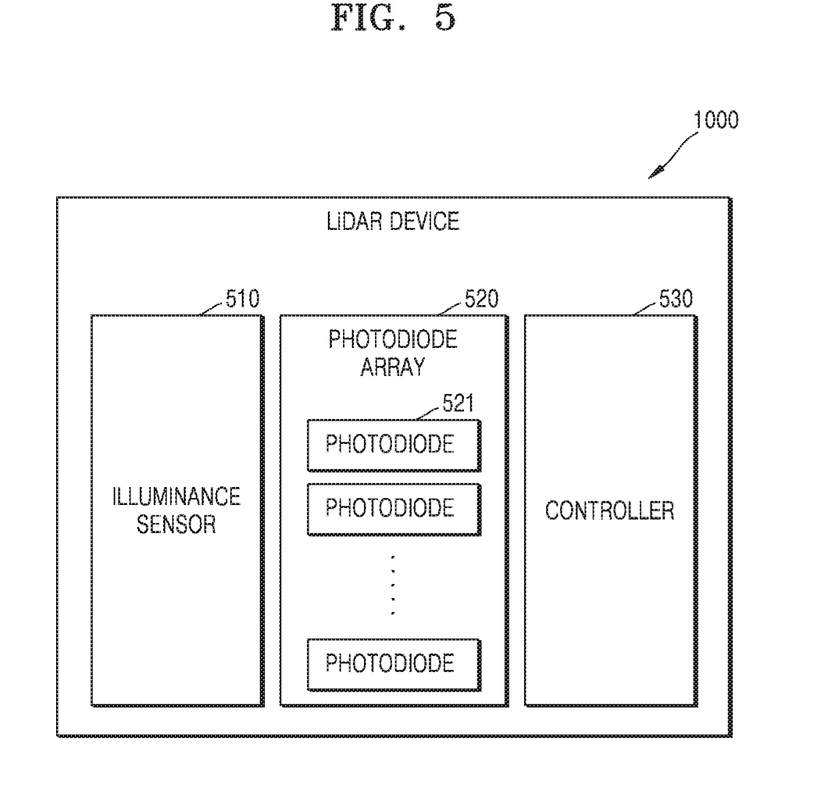
FIG. 5 is a block diagram illustrating an example of a LiDAR device according to example embodiments.

FIG. 5 is a block diagram illustrating an example of a LiDAR device 1000 according to example embodiments.

Referring to FIG. 5, the LiDAR device 1000 may include an illuminance sensor 510, a photodiode array 520 including a plurality of photodiodes 521, and a controller 530. The photodiodes 521, the photodiode array 520, and the controller 530 of FIG. 5 may respectively correspond to the photodiodes, the pixel sections 222, and the controller 300 of FIGS. 1 to 4.

The LiDAR device 1000 may further include other general purpose components in addition to the components shown in FIG. 5.

The illuminance sensor 510 may detect an illuminance of light received by the LiDAR device 1000. The illuminance sensor 510 may detect ambient illumination by light around the LiDAR device 1000 in addition to reflected light received by the LiDAR device 1000 after light emitted from a light transmitting device is reflected from an object. The illuminance sensor 510 may transmit information about the detected illumination to the controller 530. Lux lx may be used as a unit of illuminance detected by the illuminance sensor 510. For example, the illuminance sensor 510 may detect an illuminance of about 1,000 lx in an environment having an ambient illuminance by artificial illumination and detect an illuminance of about 100,000 lx in an environment having an ambient illuminance by direct sunlight.

The photodiode 521 may detect light received by the LiDAR device 1000. The photodiode 521 may generate a current by receiving light. The photodiode 521 may transmit the generated current to the controller 530.

In an example embodiment, the photodiode 521 may generate a current only when light with intensity above a threshold value is received. The photodiode 521 may generate a current having a constant magnitude regardless of the intensity of light when light having an intensity greater than or equal to a threshold value is received. In another example embodiment, the photodiode 521 may generate a current only when light having an intensity greater than or equal to a threshold value is received, but may generate a current having a magnitude proportional to the intensity of light. In each example embodiment, the threshold value may be variously set according to the purpose of use of the LiDAR device 1000. For example, in a medical field that needs to detect minute light, the threshold value may be set low. In another example embodiment, the photodiode 521 may generate a current in proportion to the intensity of light received without a threshold value.

The photodiode array 520 may be configured by a plurality of photodiodes 521 connected in parallel. In the photodiode array 520, currents generated from each of the plurality of photodiodes 521 connected in parallel may be summed, and the summed current may be output. The photodiode array 520 may transmit the output current to the controller 530. The higher the illuminance detected by the illuminance sensor 510, the greater the amount of current output from the photodiode array 520.

In an example embodiment, when an SPAD is employed as the photodiode 521, the photodiode array 520 may correspond to a silicon photomulitplier (SiPM). The SiPM is a device in which a plurality of SPADs are inserted in a silicon substrate capable of detecting a single photon.

The controller 530 includes at least one processor. The processor may be implemented as an array of multiple logic gates, or may be implemented as a combination of a general purpose microprocessor and a memory in which a program that may be executed in the microprocessor is stored. Also, it will be understood by those skilled in the art that the example embodiment may be implemented by other forms of hardware. The controller 530 may control operations of the illuminance sensor 510, the photodiodes 521, the photodiode array 520, and other components included in the LiDAR device 1000. The controller 530 may determine the number of photodiodes 521 to be activated in the photodiode array 520 based on an illuminance detected by the illuminance sensor 510. A method of activating the photodiodes 521 based on an illuminance by the controller 530 will be described below with reference to FIG. 7.

Figure 6:
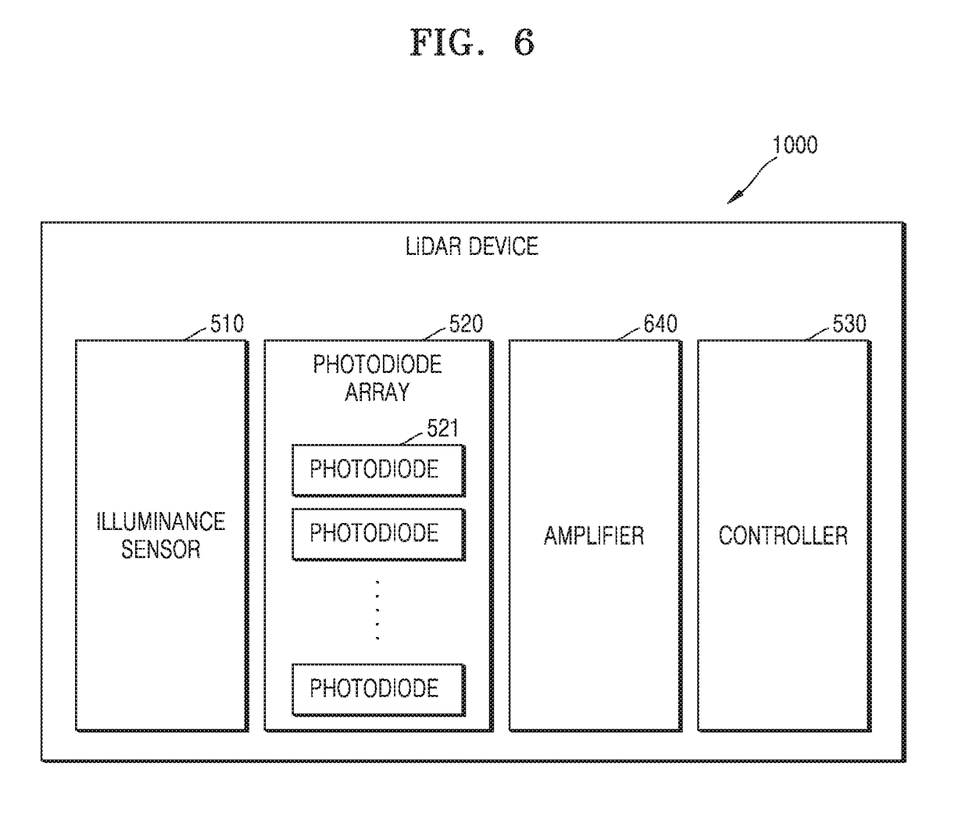
FIG. 6 is a block diagram illustrating another example of a LiDAR device according to example embodiments.

FIG. 6 is a block diagram illustrating another example of a LiDAR device 1000 according to example embodiments.

Referring to FIG. 6, the LiDAR device 1000 may include an illuminance sensor 510, a photodiode array 520 including a plurality of photodiodes 521, a controller 530, and an amplifier 640. The illuminance sensor 510, the photodiodes 521, the photodiode array 520, and the controller 530 of FIG. 6 may respectively correspond the illuminance sensor 510, the photodiodes 521, the photodiode array 520, and the controller 530 of FIG. 5. Also, the amplifier 640 may include the current-voltage conversion circuit 241 and the amplifier 243 of FIG. 4.

The LiDAR device 1000 may further include other general purpose components in addition to the components shown in FIG. 6.

The photodiode array 520 may output a current generated from the plurality of photodiodes 521 and transmit the output current to the amplifier 640. The controller 530 may control an operation of the amplifier 640.

The amplifier 640 is connected to the photodiode array 520 and may receive a current output from the photodiode array 520. The amplifier 640 may amplify the received current. For example, the amplifier 640 may amplify the received current, may convert the amplified current into a voltage, and may amplify the voltage. The amplifier 640 may output a signal generated from the amplified voltage. The signal output from the amplifier 640 may be transmitted to the controller 530. The controller 530 may perform signal processing to obtain information on the object based on the received signal.

Moreover, noise may be included in the signal output from the amplifier 640 according to the magnitude of a current input to the amplifier 640. For example, when an overcurrent is output from the photodiode array 520, the overcurrent may be input to the amplifier 640, and the magnitude of noise in the signal output from the amplifier 640 may increase. As the magnitude of noise increases, a signal-to-noise ratio (SNR) of a signal output from the amplifier 640 and input to the controller 530 may decrease. Since the greater the SNR of a signal, the smaller the magnitude of noise relative to that of the signal, the signal is favorable, and as the SNR of the signal decreases, information about an object obtained by the controller 530 may be inaccurate. Therefore, the magnitude of a current input to the amplifier 640 should be controlled so that the SNR of a signal output from the amplifier 640 increases.

As an SNR of the signal output from the amplifier 640 and input to the controller 530 increases, the controller 530 may obtain more accurate information. When an SNR of a signal output from the amplifier 640 exceeds a predetermined value, information obtained by the controller 530 may be determined to be correct. In this case, the corresponding value may be set to a reference value indicating the minimum SNR that the LiDAR device 1000 should maintain. The controller 530 may control the magnitude of a current output from the photodiode array 520 such that an SNR of a signal output from the amplifier 640 exceeds a reference value. A reference value with respect to an SNR of a signal may be arbitrarily set according to the performance of respective components included in the LiDAR device 1000, a surrounding environment, the purpose of use of the LiDAR device 1000, etc.

In an example embodiment, the amplifier 640 may be a circuit including an AFE or a TDC according to the type of the photodiodes 521. When the amplifier 640 is a circuit including an AFE, the amplifier 640 may include a transimpedance amplifier (TIA), which is a current-voltage conversion circuit, and an amplifier for amplifying a voltage converted by the TIA.

Figure 7:
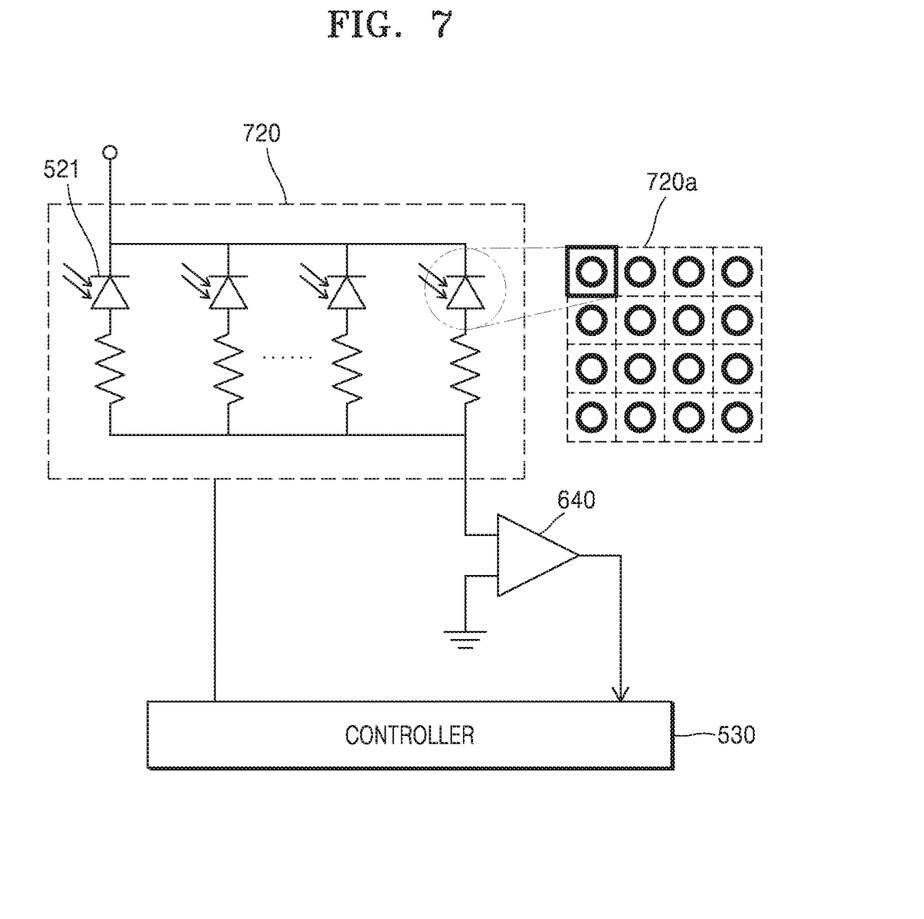
FIG. 7 is a diagram illustrating an example of a photodiode array in which all of photodiodes are activated, according to example embodiments.
Figure 8:
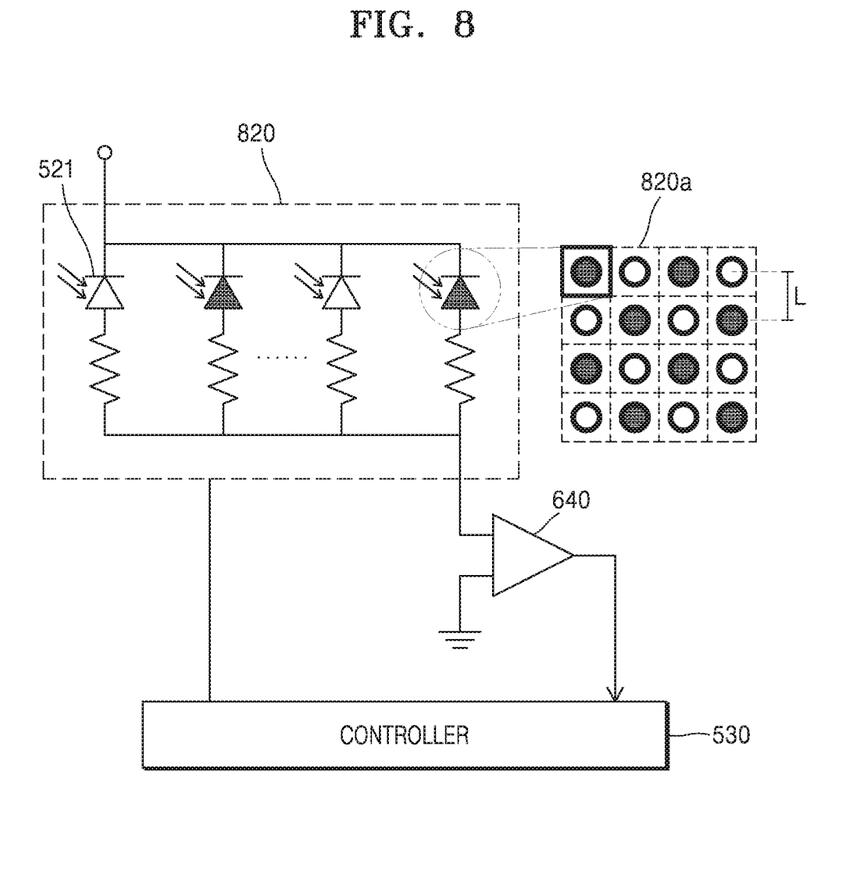
FIG. 8 is a diagram illustrating an example of a photodiode array in which some photodiodes are activated, according to example embodiments.

FIG. 7 is a diagram illustrating an example of a photodiode array 720 in which all photodiodes 521 are activated according to example embodiments, and FIG. 8 is a diagram illustrating an example of the photodiode array 720 in which some photodiodes 521 are activated according to example embodiments.

Referring to FIGS. 7 and 8, a LiDAR device may include photodiode arrays 720 and 820 each including a plurality of photodiodes 521, a controller 530, and an amplifier 640. The photodiodes 521, the photodiode arrays 720 and 820, the controller 530, and the amplifier 640 of FIGS. 7 and 8 may respectively correspond to the photodiodes 521, the photodiode array 520, the controller 530, and the amplifier 640 of FIG. 6.

In FIGS. 7 and 8, the photodiode arrays 720 and 820, in which only some photodiodes are displayed, and photodiode arrays 720a and 820a, in which all of the plurality of photodiodes correspond to the photodiode arrays 720 and 820, are depicted. The figures of the two photodiode arrays 720 and 720a shown in FIG. 7 both show the same example of a photodiode array. The figures of the two photodiode arrays 820 and 820a shown in FIG. 8 both show the same example of a photodiode array.

One photodiode 521 included in the photodiode arrays 720 and 820 on the left side shown in FIGS. 7 and 8 may correspond to one cell of the photodiode arrays 720a and 820a on the right side.

In the example embodiment according to FIG. 7, each of the photodiodes 521 included in the photodiode array 720, in which all of the photodiodes 521 are activated, may generate a current when receiving light having an intensity greater than a threshold value, and the current output from the photodiode array 720 may be transmitted to the amplifier 640. However, when a current is output from all the photodiodes 521 included in the photodiode array 720 because an illuminance of light received by the LiDAR device may be too high, an overcurrent may be input to the amplifier 640. Accordingly, the SNR of a signal output from the amplifier 640 and input to the controller 530 may be reduced, and thus, information obtained by the controller 530 may be inaccurate.

Although an illumination intensity of light received by the LiDAR device increases, the controller 530 may limit the number of photodiodes 521 to be activated in the photodiode array 720 in order to maintain the SNR of the signal input to the controller 530. For example, the controller 530 may activate only a determined number of photodiodes 521. The photodiodes 521, which are activated, may generate a current when light is received, and the photodiodes 521, which are deactivated, may not generate a current even when light is received.

The controller 530 may determine a fill factor of the photodiode array 720 by determining the number of photodiodes 521 to be activated. The fill factor may be a ratio of photodiodes 521, which are activated, among the plurality of photodiodes 521 included in the photodiode array 720. Also, the fill factor may be a ratio of the activated area to a total area in the photodiode array 720. In the example embodiment according to FIG. 7, since all of the photodiodes 521 included in the photodiode array 720a are activated, the fill factor is 100%. In the example embodiment according to FIG. 8, only a half of the photodiodes 521 included in the photodiode array 820a are activated, and thus, the fill factor is 50%.

The controller 530 may decrease the number of photodiodes 521 to be activated as the illuminance increases. When an illuminance is high, an overcurrent may be output from the photodiode array 720, and accordingly, the magnitude of noise of a signal input to the controller 530 is increased. Thus, the controller 530 may reduce the magnitude of a current output from the photodiode array 720 by reducing the number of photodiodes 521 to be activated.

In an example embodiment, when the detected illuminance is 1,000 lx, the controller 530 may determine the number of photodiodes 521 to be activated to be 80% of the total number of photodiodes 521, and when a detected illuminance is 100,000 lx, the controller 530 may determine the number of photodiodes 521 to be activated to be 40% of the total number of photodiodes 521. However, this is only an example for explaining that the number of photodiodes 521 being activated is decreased as the illumination intensity increases, and a ratio of the photodiodes 521 to be activated according to the illumination may be different.

The controller 530 may determine the number of photodiodes 521 to be activated such that an SNR of a signal output from the amplifier 640 exceeds a reference value by a current input to the amplifier 640. The controller 530 may maintain the SNR of a signal above a reference value even when the illumination is increased by determining the number of photodiodes 521 to be activated. As a result, the controller 530 may acquire more accurate information.

The controller 530 may select a combination in which a minimum distance between the photodiodes 521 to be activated is the farthest among combinations of the determined number of photodiodes 521. The controller 530 may determine the photodiodes 521 to be activated so that the photodiodes 521 to be activated are arranged as evenly as possible in the photodiode array 720. For example, as shown in the photodiode array 820a on the right side of FIG. 8, when the controller 530 determines to activate eight photodiodes 521 out of a total of 16 photodiodes 521, among combinations of the eight photodiodes 521, a combination in which the smallest value of distances between any two photodiodes 521 included in each combination is a maximum may be selected.

In an example, in the case of a combination that includes two photodiodes 521 that are being activated side by side in a row or column direction among the combinations of eight photodiodes 521, a minimum distance between the photodiodes 521 to be activated may correspond to L. However, in the example embodiment according to FIG. 8, the smallest value of distances between two arbitrary photodiodes included in the eight photodiodes 521 being activated in the photodiode array 820a on the right corresponds to $\sqrt{2}*L$. Therefore, a combination in which the longest minimum distance between the photodiodes 521 to be activated may be selected as in the example embodiment according to FIG. 8.

As the photodiodes 521 being activated are evenly arranged, activated regions in the photodiode array 720 may be evenly distributed. When an area activated in the photodiode array 720 is biased to a specific area, an overcurrent may occur in a specific area and noise may increase. The controller 530 may evenly distribute the activated areas in the photodiode array 720, thereby obtaining more accurate information compared to a case when the activated area is biased to a specific area.

The controller 530 may change the combination of the photodiodes 521 to be activated according to a preset period while maintaining the number of photodiodes 521 to be activated. The preset period may be variously set according to the performance of each element included in the LiDAR device, surrounding environment, the purpose of use of the LiDAR device, etc.

The controller 530 may determine a combination of the photodiodes 521 changed every cycle such that an operation period of each photodiode 521 included in the plurality of photodiodes 521 is as long as possible. An operation period of the photodiode 521 may be a period in which each photodiode 521 included in the plurality of photodiodes 521 is activated. As the cycles are repeated, the photodiodes 521 of different combinations may be activated in each cycle. The controller 530 may determine a combination of the photodiodes 521 that are changed in each period such that each photodiode 521 is re-activated in the longest period after the photodiode 521 is activated.

For example, in the example embodiment according to FIG. 8, the controller 530 may maintain eight photodiodes 521 to be activated. In the next period, the controller 530 may activate the remaining eight photodiodes 521, which have been deactivated, and may deactivate the eight photodiodes 521, which have been activated. The controller 530 may repeatedly perform such an operation.

The controller 530 may prevent the photodiode 521 from being consumed by preventing the same photodiode 521 from being continuously activated. When the photodiode 521 is continuously activated, the consumption of the photodiode 521 may be accelerated, thereby increasing noise of a signal. The controller 530 may control noise of a signal to be reduced by increasing the operation period of each photodiode 521 to be as long as possible.

Figure 9:
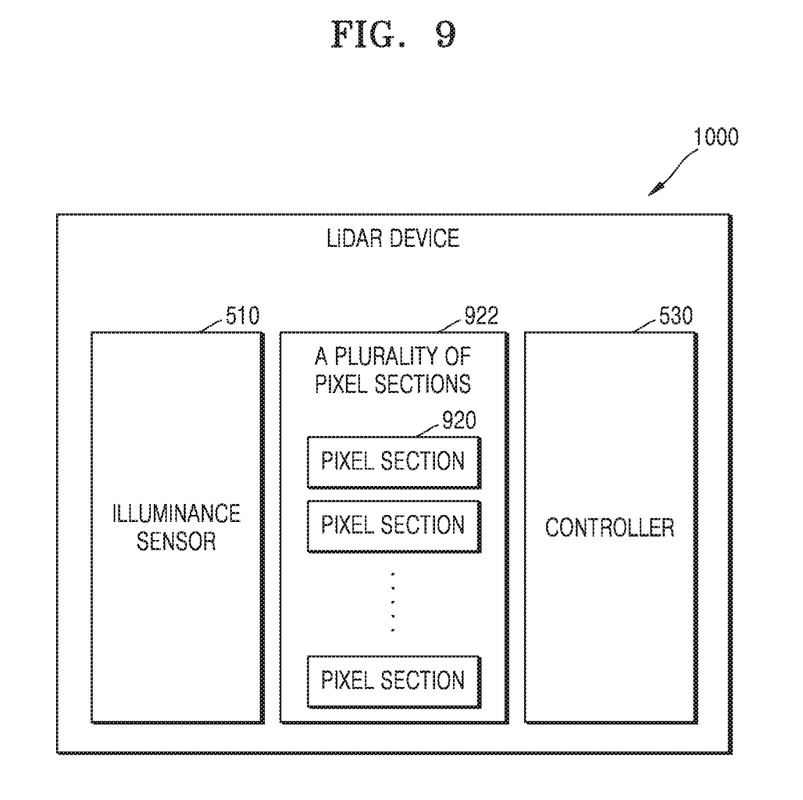
FIG. 9 is a block diagram illustrating another example of a LiDAR device according to example embodiments.
Figure 10:
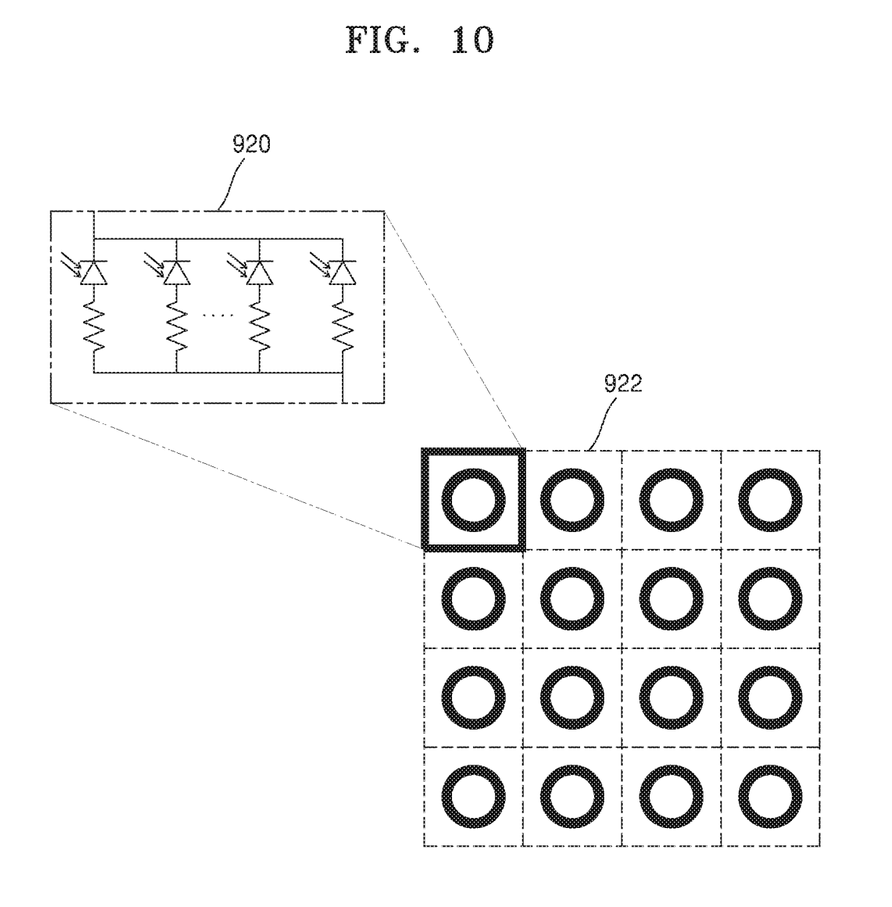
FIG. 10 is a diagram for specifically illustrating a plurality of pixel sections according to the example embodiment of FIG. 9.

FIG. 9 is a block diagram illustrating another example of a LiDAR device 1000 according to example embodiments. FIG. 10 is a diagram for specifically illustrating a plurality of pixel sections according to the example embodiment of FIG. 9.

Referring to FIGS. 9 and 10, the LiDAR device 1000 may include an illuminance sensor 510, a pixel section 920, a plurality of pixel sections 922 including plural number of pixel sections 920, and a controller 530. The illuminance sensor 510, the pixel section 920, and the controller 530 of FIGS. 9 and 10 may respectively correspond to the illuminance sensor 510, the photodiode array 520, and the controller 530 of FIG. 5. Also, the plurality of pixel sections 922 may correspond to the detector array 220 of FIGS. 1 to 4.

The LiDAR device 1000 may further include other general purpose components in addition to the components shown in FIG. 9.

The pixel section 920 may be configured as a photodiode array. The LiDAR device 1000 may include the plurality of pixel sections 922 connected in parallel to each other. Each pixel section 920 may individually detect light emitted from a plurality of light sources. Information detected by each pixel section 920 may be transmitted to the controller 530 through each channel. Some pieces of information about an object may be obtained from each pixel section 920. All information about the object may be obtained from the plurality of pixel sections 922.

Each pixel section 920 may be configured as a photodiode array including photodiodes having the same structure as each other, but is not necessarily limited thereto. Each pixel section 920 may be configured as a photodiode array including photodiodes having different structures from each other.

Each pixel section 920 may output a current as light is received, and the plurality of pixel sections 922 may output a current in which currents output from each pixel section 920 are summed. The plurality of pixel sections 922 may transmit an outputted current to the controller 530.

The higher the illuminance detected by the illuminance sensor 510, the greater the magnitude of current output from the plurality of pixel sections 922. When an illuminance is high, an overcurrent may be output from the plurality of pixel sections 922, and the magnitude of noise in a signal may increase due to the overcurrent. As the noise of a signal increases, information about an object acquired by the controller 530 may become inaccurate. Accordingly, the controller 530 may control the magnitude of an output current by controlling the number of pixel sections 920 to be activated among the plurality of pixel sections 922.

The controller 530 may control operations of the plurality of pixel sections 922. The controller 530 may determine the number of pixel sections 922 to be activated among the plurality of pixel sections 922 based on an illuminance and may activate only the determined number of pixel sections 922.

The controller 530 may decrease the number of pixel sections 922 to be activated as the illuminance increases. When an illuminance is high, an overcurrent may occur in the plurality of pixel sections 922, and accordingly, the magnitude of noise of a signal input to the controller 530 is increased. Thus, the controller 530 may reduce the magnitude of a current output from plurality of pixel sections 922 by reducing the number of photodiodes 521 to be activated. As the magnitude of noise of a signal input to the controller 530 is decreased, the controller 530 may obtain more accurate information.

Even if the illuminance of light received by the LiDAR device 1000 increases, the controller 530 may determine the number of pixel sections 922 to be activated such that the magnitude of a current output from the plurality of pixel sections 922 does not exceed a predetermined magnitude. The pixel sections 920, which are activated, may generate a current when light having an intensity greater than or equal to a threshold is received, and the pixel sections 920, which are inactivated, may not generate a current even when light having an intensity greater than or equal to a threshold is received.

When it is determined that information obtained by the controller 530 is correct when the magnitude of a current output from the plurality of pixel sections 922 is equal to or less than a predetermined magnitude, the controller 530 may control the number of pixel sections 922 to be activated such that a current output from the plurality of pixel sections 922 does exceed the predetermined magnitude of the current. The magnitude of the current may be set in various ways according to the performance of the respective components included in the LiDAR device, an environment, and the purpose of use of the LiDAR device.

Figure 11:
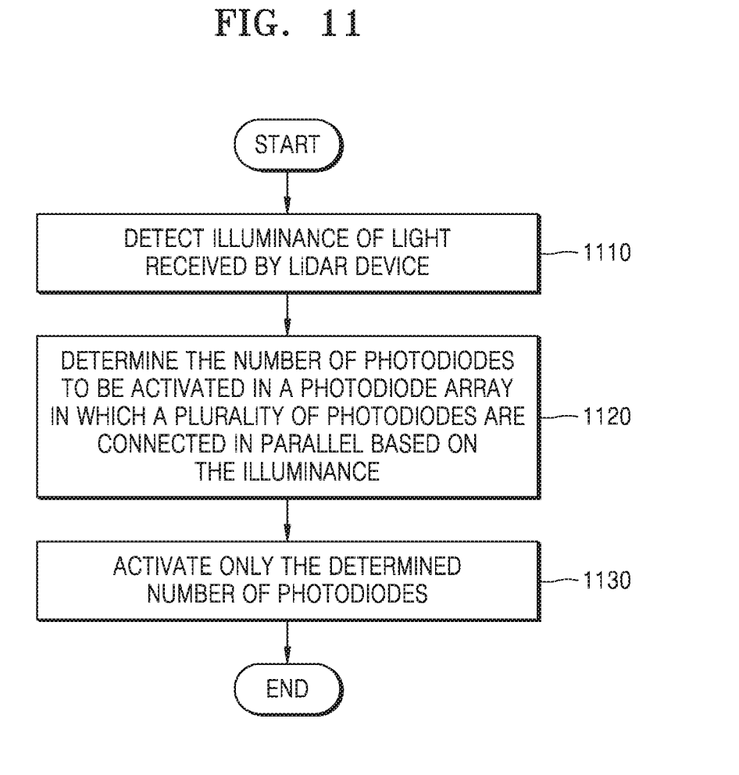
FIG. 11 is a flowchart illustrating an example of a method of operating a LiDAR device, according to example embodiments.

FIG. 11 is a flowchart illustrating an example of a method of operating a LiDAR device, according to example embodiments.

Referring to FIG. 11, a method of operating the LiDAR device includes operations performed in a time series in the LiDAR device illustrated in FIGS. 1 to 10. Accordingly, the descriptions given above about the LiDAR device shown in FIGS. 1 to 10 may also be applied to the method of FIG. 11.

In operation 1110, the LiDAR device may detect illuminance of light received by the LiDAR device.

In operation 1120, the LiDAR device may determine the number of photodiodes to be activated in the photodiode array configured by connecting the plurality of photodiodes in parallel.

If illuminance is too high, an overcurrent may be output from the photodiode array. The overcurrent generated from the photodiode array may increase noise of a signal obtained by the LiDAR device. In order to prevent an overcurrent from being output from the photodiode array, the LiDAR device may reduce the number of photodiodes to be activated as the intensity of illumination increases.

The LiDAR device may further include an amplifier connected to the photodiode array to receive a current output from the photodiode array. The LiDAR device may determine the number of photodiodes to be activated such that an SNR of a signal output from the amplifier by a current input to the amplifier exceeds a reference value.

In operation 1130, the LiDAR device may activate only a determined number of photodiodes. When light having an intensity above a threshold is received, only activated photodiodes may generate a current. The LiDAR device may prevent overcurrent from being output from the photodiode array by limiting the number of photodiodes that are activated.

The LiDAR device may select a combination in which a minimum distance is the farthest between the photodiodes to be activated among combinations of the determined number of photodiodes.

The LiDAR device may change the combination of photodiodes being activated according to a predetermined period while maintaining the determined number, and the combination of photodiodes to be activated may be determined such that an operation period of each photodiode included in the plurality of photodiodes is as long as possible.

Moreover, the LiDAR device may further include a plurality of pixel sections each configured as a photodiode array and connected in parallel with each other. The LiDAR device may determine the number of pixel sections to be activated among the plurality of pixel sections based on illuminance and may activate only the determined number of pixel sections.

The LiDAR device may reduce the number of pixel sections to be activated as the illumination intensity increases. The LiDAR device may determine the number of pixel sections to be activated such that a current output from the plurality of pixel sections does not exceed a predetermined magnitude. As a result, the LiDAR device may prevent an overcurrent from being output from the plurality of pixel sections.

Each of the plurality of photodiodes may generate a current only when light having an intensity above a threshold is received.

Moreover, the above-described method of operating the LiDAR device of FIG. 11 may be recorded on a non-transitory computer-readable recording medium having one or more programs including instructions for executing the method. Examples of non-transitory computer-readable recording media include magnetic media, such as hard disks, floppy disks, and magnetic tape, optical media, such as CD-ROMs and DVDs, magneto-optical media, such as floptical disks, and hardware devices specifically configured to store and execute program instructions, such as ROM, RAM, flash memory, etc. Examples of program instructions include machine code produced by a compiler as well as high-level language code that may be executed by a computer by using an interpreter etc.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A light detection and ranging (LiDAR) device comprising:
    an illuminance sensor configured to detect illuminance of light received by the LiDAR device;
    a photodiode array comprising a plurality of photodiodes that are connected in parallel, the plurality of photodiodes being configured to generate a current based on the light received; and
    a processor configured to determine a number of photodiodes included in the photodiode array to be activated based on the illuminance and activate the determined number of photodiodes.

2. The LiDAR device of claim 1, wherein the processor is further configured to reduce the number of photodiodes to be activated as the illuminance increases.

3. The LiDAR device of claim 1, further comprising an amplifier that is connected to the photodiode array and is configured to receive a current output from the photodiode array,
    wherein the processor is further configured to determine the number of photodiodes to be activated such that a signal-to-noise ratio (SNR) of a signal output from the amplifier based on the current received exceeds a reference value.

4. The LiDAR device of claim 1, wherein the processor is further configured to select a combination in which a minimum distance between the photodiodes to be activated is farthest among combinations of the determined number of photodiodes.

5. The LiDAR device of claim 1, wherein the processor is further configured to:
    change a combination of the photodiodes to be activated based on a preset period while maintaining the determined number, and
    determine a combination of the photodiodes being activated such that an operation period of each photodiode included in the plurality of photodiodes is maximized.

6. The LiDAR device of claim 1, further comprising a plurality of pixel sections respectively included in the photodiode array and connected in parallel to each other,
    wherein the processor is further configured to determine the number of pixel sections to be activated among the plurality of pixel sections based on the illuminance and activate the determined number of pixel sections.

7. The LiDAR device of claim 6, wherein the processor is further configured to reduce the number of pixel sections to be activated as the illuminance increases.

8. The LiDAR device of claim 6, wherein the processor is further configured to determine the number of pixel sections to be activated such that a current output from the plurality of pixel sections is less than or equal to a preset magnitude.

9. The LiDAR device of claim 1, wherein each of the plurality of photodiodes is configured to generate a current based on receiving light having an intensity above a threshold.

10. A method of operating a light detection and ranging (LiDAR) device, the method comprising:
    detecting an illuminance of light received by the LiDAR device;
    determining a number of photodiodes to be activated in a photodiode array comprising a plurality of photodiodes that are connected in parallel based on the illuminance; and
    activating the determined number of photodiodes.

11. The method of claim 10, wherein the determining of the number of photodiodes comprises reducing the number of photodiodes to be activated as the illuminance increases.

12. The method of claim 10, wherein the determining of the number of photodiodes comprises determining the number of photodiodes to be activated such that a signal to noise ratio (SNR) of a signal output from an amplifier exceeds a reference value based on a current that is output from the photodiodes and is input to the amplifier.

13. The method of claim 10, wherein the activating of the photodiodes further comprises selecting a combination in which a minimum distance between the photodiodes being activated is farthest among combinations of the determined number of photodiodes.

14. The method of claim 10, wherein the activating of the photodiodes comprises:
    changing a combination of the photodiodes being activated based on a preset period while maintaining the determined number of photodiodes, and
    determining a combination of the activated photodiodes such that an operation period of each photodiode included in the plurality of photodiodes is maximized.

15. The method of claim 10, wherein the LiDAR device further comprises a plurality of pixel sections each included in the photodiode array and connected in parallel to each other, and
    the method further comprises:
        determining the number of pixel sections to be activated among the plurality of pixel sections based on the illuminance; and
        activating the determined number of pixel sections.

16. The method of claim 15, wherein the determining of the number of the pixel sections comprises reducing the number of pixel sections to be activated as the illuminance increases.

17. The method of claim 15, wherein the determining of the number of the pixel sections comprises determining the number of pixel sections to be activated such that a current output from the plurality of pixel sections is less than or equal to a preset magnitude.

18. A non-transitory computer-readable recording medium having recorded thereon a program for executing the method of claim 10 on a computer.

19. The method of claim 10, wherein a current is generated by the photodiodes based on receiving light having an intensity above a threshold.

20. A light detection and ranging (LiDAR) device comprising:
    a light transmitting device comprising a plurality of light sources and a beam steering device;
    a light receiving device configured to receive light reflected by an object that is irradiated with light emitted from the light transmitting device, the light receiving device comprising:
        an illuminance sensor configured to detect illuminance of the light received; and a photodiode array comprising a plurality of photodiodes configured to generate a current based on the light received; and a processor configured to determine a number of photodiodes included in the photodiode array to be activated based on the illuminance, and activate the determined number of photodiodes.

* * * * *